(12) United States Patent
Counterman

(10) Patent No.: US 8,763,101 B2
(45) Date of Patent: Jun. 24, 2014

(54) MULTI-FACTOR AUTHENTICATION USING A UNIQUE IDENTIFICATION HEADER (UIDH)

(75) Inventor: Raymond C. Counterman, Canton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 66 days.

(21) Appl. No.: 13/477,578

(22) Filed: May 22, 2012

(65) Prior Publication Data

US 2013/0318581 A1    Nov. 28, 2013

(51) Int. Cl.
*G06F 17/30* (2006.01)
*H04L 9/32* (2006.01)
*H04L 29/06* (2006.01)
*H04W 12/06* (2009.01)
*H04W 84/12* (2009.01)

(52) U.S. Cl.
CPC ............... *H04L 63/08* (2013.01); *H04W 12/06* (2013.01); *H04W 84/12* (2013.01); *H04L 2209/80* (2013.01)
USPC .......................... 726/7; 726/3; 726/5; 713/168

(58) Field of Classification Search
CPC . H04L 63/08; H04L 2209/56; H04L 63/0823; H04L 2209/80; H04W 12/06; H04W 88/08; H04W 84/12; G06Q 20/04; G06Q 20/32; G06F 21/31
USPC .............. 726/1–7, 26–29; 713/168, 170, 182, 713/183, 189
See application file for complete search history.

(56) References Cited

U.S. PATENT DOCUMENTS

| | | | |
|---|---|---|---|
| 7,606,918 B2 * | 10/2009 | Holzman et al. ............... | 709/229 |
| 8,151,328 B1 * | 4/2012 | Lundy et al. ....................... | 726/5 |
| 8,195,956 B2 * | 6/2012 | Bilodi ............................ | 713/189 |
| 2006/0075230 A1 * | 4/2006 | Baird et al. .................... | 713/168 |
| 2007/0050303 A1 * | 3/2007 | Schroeder et al. .............. | 705/67 |
| 2007/0136573 A1 * | 6/2007 | Steinberg ....................... | 713/155 |
| 2007/0220594 A1 * | 9/2007 | Tulsyan ............................ | 726/5 |
| 2007/0240202 A1 * | 10/2007 | Sullivan et al. .................... | 726/4 |
| 2008/0189772 A1 * | 8/2008 | Sims et al. ........................ | 726/5 |
| 2009/0037995 A1 * | 2/2009 | Zapata et al. ..................... | 726/9 |
| 2009/0260064 A1 * | 10/2009 | McDowell et al. ............... | 726/4 |
| 2010/0011212 A1 * | 1/2010 | Anemikos et al. ............. | 713/171 |
| 2010/0138297 A1 * | 6/2010 | Fitzgerald et al. .......... | 705/14.53 |
| 2010/0250937 A1 * | 9/2010 | Blomquist et al. ............. | 713/170 |
| 2010/0250957 A1 * | 9/2010 | Cuppett ........................ | 713/186 |
| 2010/0274913 A1 * | 10/2010 | Ando ............................ | 709/229 |
| 2011/0246235 A1 * | 10/2011 | Powell et al. ...................... | 705/3 |
| 2011/0258120 A1 * | 10/2011 | Weiss .............................. | 705/44 |
| 2011/0275348 A1 * | 11/2011 | Clark et al. .................... | 455/411 |

(Continued)

*Primary Examiner* — Catherine Thiaw

(57) ABSTRACT

A system is configured to receive, from a user device, information associated with a request to receive a service from a server device, the information including a unique identifier, an identifier, associated with a user of the user device, being encoded with a key to obtain the unique identifier. The system may also be configured to extract the unique identifier from the information; retrieve, from a memory, the identifier, associated with the user, that corresponds to the unique identifier; obtain an indication whether the identifier, associated with the user, is trusted; perform one or more additional authentication operations on the user when the identifier, associated with the user, is trusted; and transmit, to the server device, a notification that indicates that the user is authenticated when the one or more additional authentication operations indicate that the user device is authenticated.

20 Claims, 13 Drawing Sheets

(56) References Cited

U.S. PATENT DOCUMENTS

| | | | |
|---|---|---|---|
| 2012/0016662 A1* | 1/2012 | Boldyrev et al. | 704/9 |
| 2012/0096538 A1* | 4/2012 | Delos Reyes et al. | 726/12 |
| 2012/0124378 A1* | 5/2012 | Chang | 713/172 |
| 2012/0135712 A1* | 5/2012 | Bari | 455/411 |
| 2012/0144464 A1* | 6/2012 | Fakhrai et al. | 726/6 |
| 2012/0200391 A1* | 8/2012 | Sugiyama et al. | 340/5.82 |
| 2012/0233682 A1* | 9/2012 | Finogenov | 726/7 |
| 2012/0311328 A1* | 12/2012 | Wang et al. | 713/168 |
| 2013/0031615 A1* | 1/2013 | Woodward et al. | 726/4 |
| 2013/0086633 A1* | 4/2013 | Schultz | 726/2 |
| 2013/0104203 A1* | 4/2013 | Davis et al. | 726/5 |
| 2013/0152221 A1* | 6/2013 | Yin et al. | 726/31 |
| 2013/0205360 A1* | 8/2013 | Novak et al. | 726/1 |
| 2013/0205380 A1* | 8/2013 | Avni et al. | 726/7 |
| 2013/0239176 A1* | 9/2013 | Terris et al. | 726/4 |
| 2013/0339740 A1* | 12/2013 | Ben-Shalom et al. | 713/175 |

\* cited by examiner

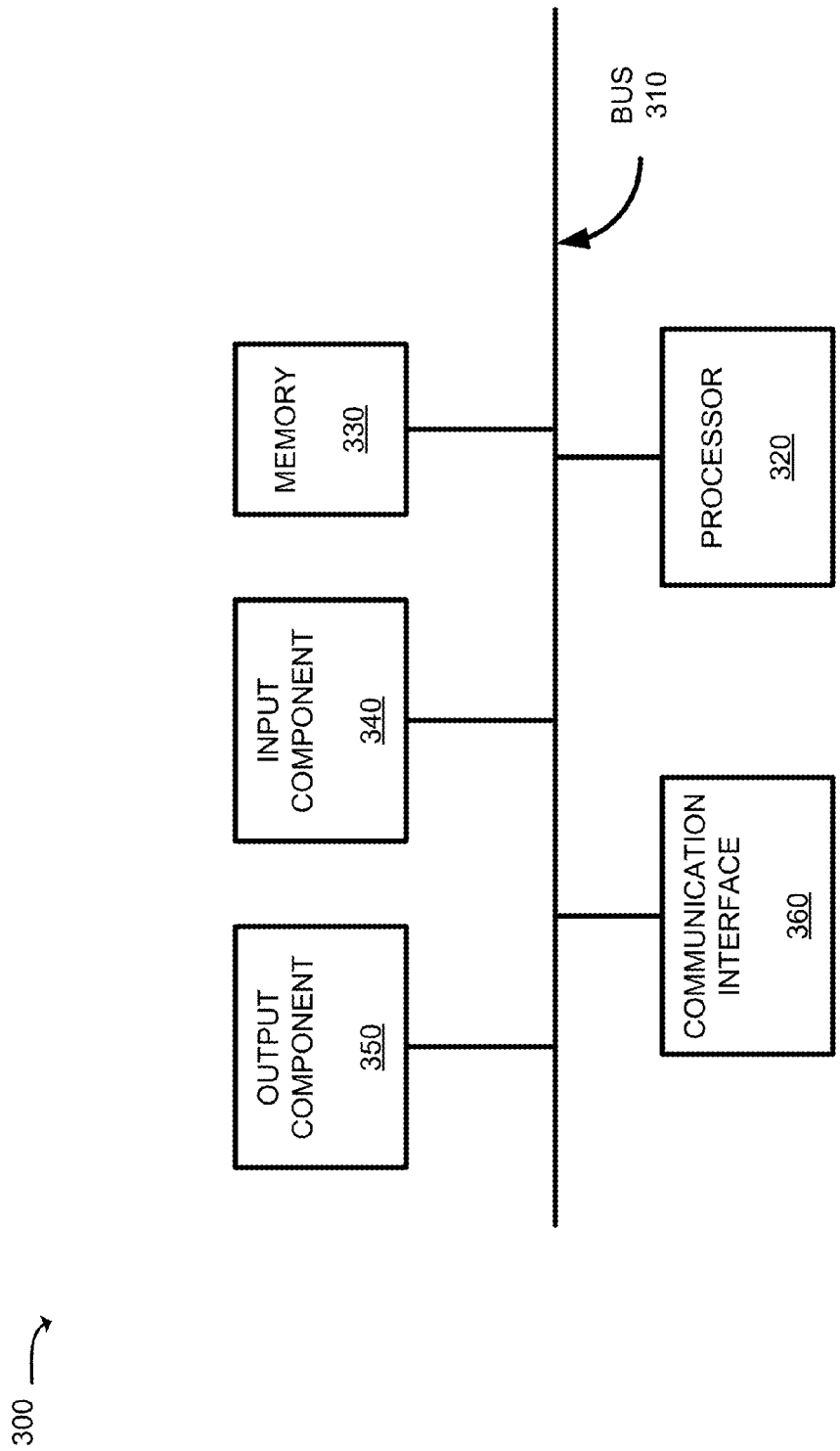

MULTI-FACTOR AUTHENTICATION USING A UNIQUE IDENTIFICATION HEADER (UIDH)

BACKGROUND

Service provider networks transport more and more traffic associated with a variety of services, applications, and content. The service provider networks cannot always verify the trustworthiness of a user that is using a user device to access the services, applications, and content and/or to obtain information associated with the service provider network. Not knowing and/or verifying the trustworthiness of the user and/or the user device may cause the service provider network to become vulnerable to an unknown and/or nefarious user, user device, network, and/or application attempting to access the services, applications, and/or content.

BRIEF DESCRIPTION OF THE DRAWINGS

FIG. 3 is a diagram of example components of one or more of the devices of FIG. 1;

DETAILED DESCRIPTION OF PREFERRED EMBODIMENTS

The following detailed description refers to the accompanying drawings. The same reference numbers in different drawings may identify the same or similar elements.

Systems and/or methods described herein may authenticate a user using a unique identification header (UIDH), that is embedded within traffic received from a user device. The UIDH may be generated by encoding an identifier, associated with the user, and a key that is valid for a period of time. The UIDH may, also, or alternatively, obfuscate the identity of the user. Authenticating the user, using the UIDH, may enable the user to be authenticated without requiring the user to manage multiple passwords, personal identification numbers (PINs), etc., thus, improving the user experience.

The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

Figure 1A:
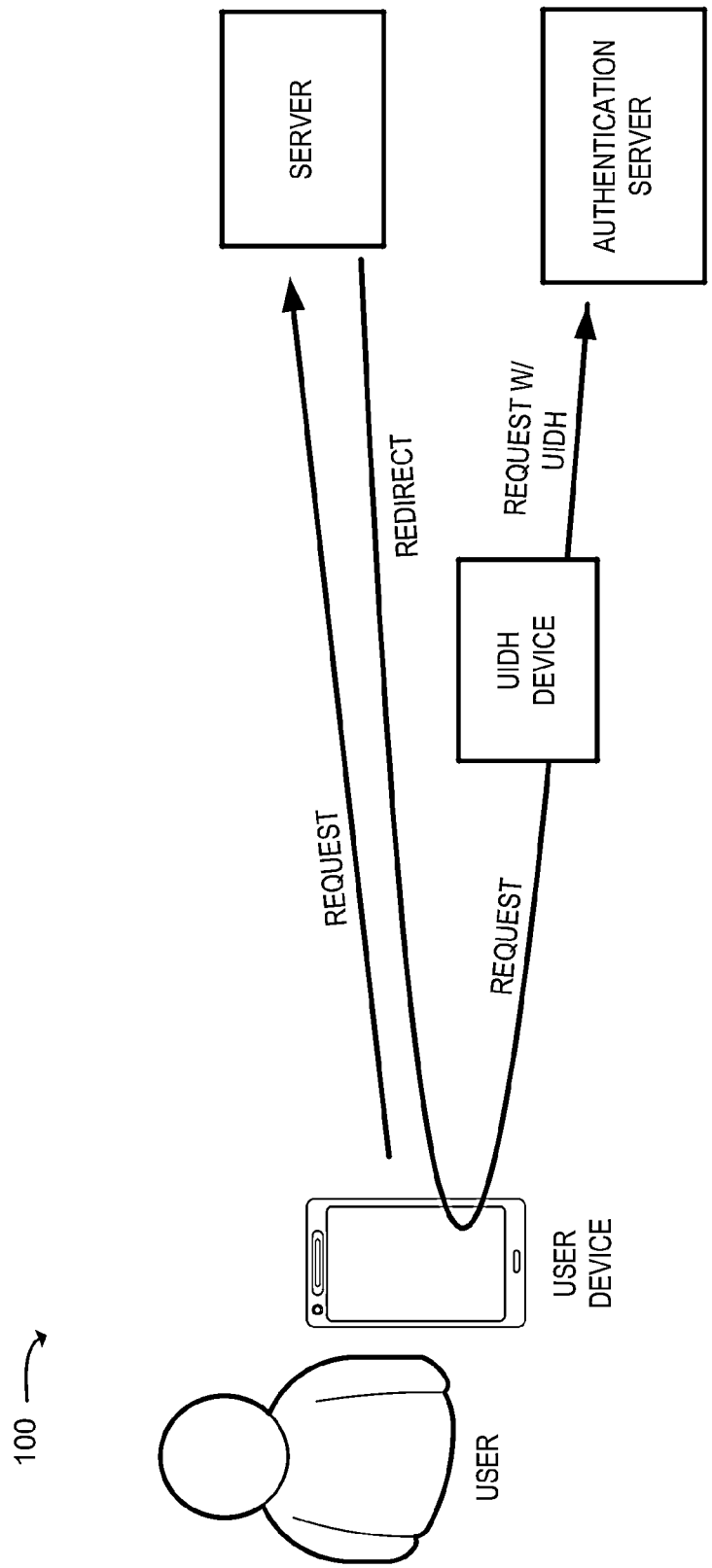
FIGS. 1A, 1B, and 1C are diagrams illustrating an overview of an example implementation described herein.
Figure 1B:
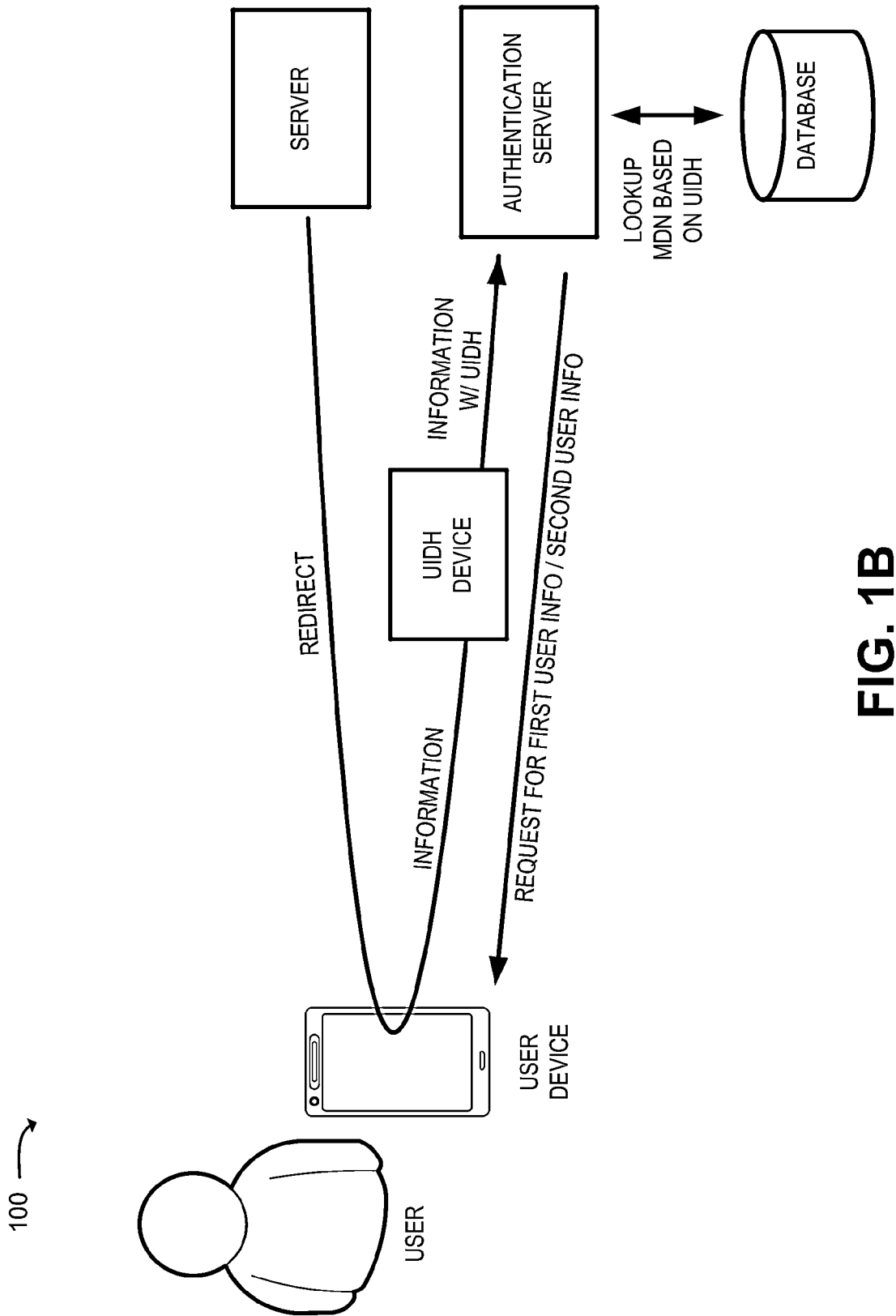
Figure 1C:
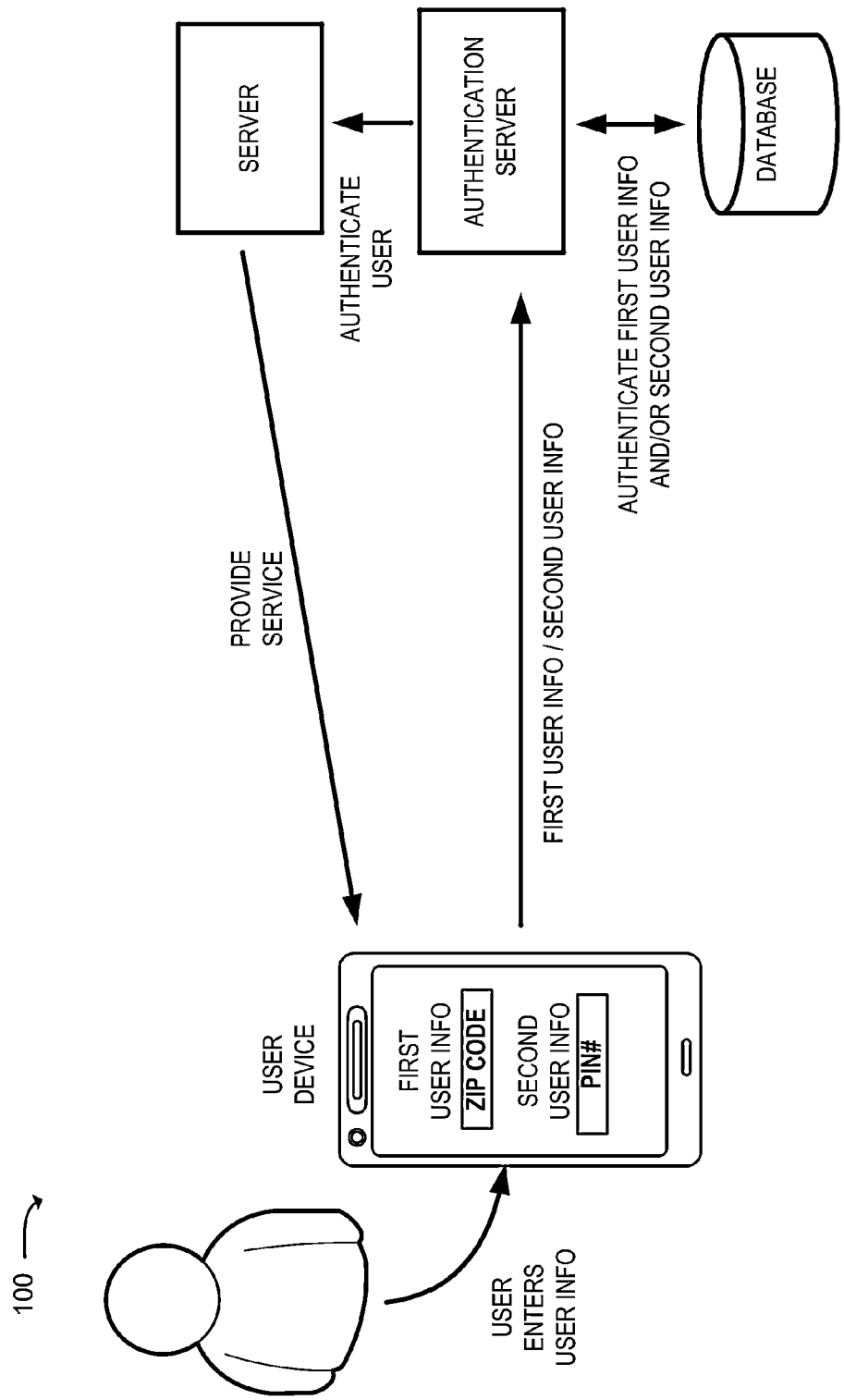

FIGS. 1A, 1B, and 1C are diagrams illustrating an overview of an example implementation 100 described herein. Assume, for example implementation 100, that a user desires to receive a service from a server and causes a user device to communicate with a server to receive the service. The user device may, for example, send a request for the service to the server, as shown in FIG. 1A. The server may receive the request and may redirect the user device to communicate with an authentication server via a UIDH device. The user device may, based on the redirection, send the request to the UIDH device. The UIDH device may receive the request and may, based on the request, obtain information associated with a user, of the user device, such as an identifier (e.g., a mobile directory number (MDN), etc.) and/or some other information associated with the user. The UIDH device may also, or alternatively, use a mechanism (e.g., a cryptographic hash function or some other mathematical function) to generate a UIDH based on the MDN. The UIDH device may also, or alternatively, insert the UIDH into the request (e.g., into a packet header, trailer, payload, etc. associated with the request) and may send a modified request, that includes the UIDH, to the authentication server.

As shown in FIG. 1B, the authentication server may receive the modified request and may, for example, extract the UIDH from the modified request. The authentication server may also, or alternatively, perform a lookup operation to identify an MDN, stored in a database, that corresponds to the UIDH extracted from the modified request. The authentication server may determine whether the MDN is a trusted MDN. Additionally, or alternatively, the authentication server may provide, to the user device, a request for the user to provide first user information that is known to the user (e.g., a zip code, a billing address, a shipping address, etc.). Additionally, or alternatively, the authentication server may determine that the user device corresponds to a type of user device with which two or more users are associated, such as a mobile wireless local area network (WLAN) (e.g., a mobile WiFi device, etc.) device (hereinafter referred to as a "MiFi device"). When the user device corresponds to the type of user device with which two or more users are associated, the authentication server may provide, to the user device, a request for the user to provide second user information that is possessed by the user (e.g., a personal identification number (PIN), a username, a password, etc.) and/or other information (e.g., biometric information, etc.).

The user device may receive the request for the first user information and/or the second user information, as shown in FIG. 1B, and may, as shown in FIG. 1C, provide a user interface that enables the user to enter the first user information and/or the second user information. The user may enter the first user information (e.g., shown as "zip code") and/or the second user information (e.g., shown as "PIN#") and the user device may provide the first user information and/or the second user information to the authentication server. The authentication server may receive the first user information and may, for example, authenticate the user when the received first user information matches the first user information stored in a database. The authentication server may also, or alternatively, authenticate the user when the received second user information matches second user information stored in the database. The authentication server may provide a notification to the server that the user is authenticated, which may cause the server to provide the service to the user device.

Figure 2:
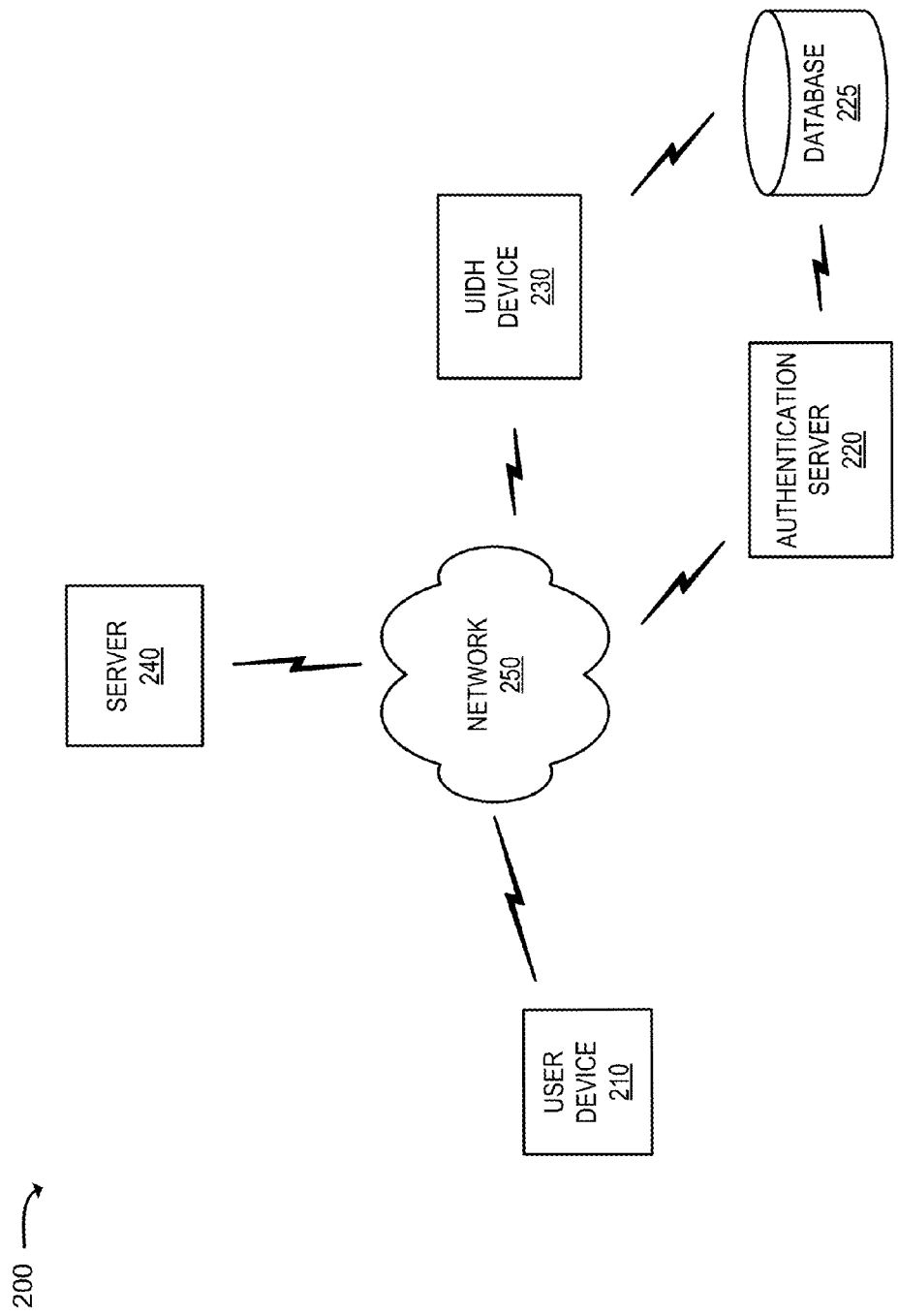
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an authentication server 220, a database 225, a unique identifier header (UIDH) device 230 (hereinafter referred to as a "UIDH device 230"), a server 240, and a network 250. The number of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2.

Also, in some implementations, one or more of the devices of environment 200 may perform one or more functions described as being performed by another one or more of the devices of environment 200. In one example, authentication server 220 and UIDH device 230 may be combined into a single device and/or system. UIDH device 230 could be integrated into different devices in other examples. Devices and/or networks of environment 200 may interconnect via wired connections, wireless connections, or a combination of wired and wireless connections.

User device 210 may include any computation or communication device that is capable of communicating via network 250. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, tablet computer, a landline telephone, a set top box (STB), a television, a camera, a personal gaming system, or another type of computation or communication device. The description to follow will generally refer to user device 210 as a wireless mobile communication device. The description is not limited, however, to a wireless mobile communication device and may equally apply to other types of user devices.

Authentication server 220 may include one or more devices that gather, process, search, store, and/or provide information in a manner described herein. For example, authentication server 220 may perform authentication operations to authenticate a user. Authentication server 220 may also, or alternatively, extract a UIDH from traffic received from user device 210. Authentication server 220 may perform a lookup operation to identify an identifier, associated with the user, that corresponds to the UIDH and may use the identifier to authenticate the user. Additionally, or alternatively, authentication server 220 may obtain user information, from the user and via user device 210, and may authenticate the user when the user information matches user information stored in a database.

Database 225 may include one or more devices that store information used by authentication server 220 and/or UIDH device 230 to perform operations described herein. Database 225 may, for example, store user information, associated with users of user devices 210. Database 225 may also, or alternatively, store a lookup table that associates UIDHs with identifiers associated with the users. Additionally, or alternatively, database 225 may store a lookup table that associates the user information with the identifiers. The identifiers and user information will be described in greater detail below with respect to FIG. 4B.

UIDH device 230 may include one or more network devices that gather, process, search, store, and/or provide information in a manner described herein. For example, UIDH device 230 may process requests for a service, received from user device 210, by generating a UIDH based on an identifier associated with a user. UIDH device 230 may, for example, monitor traffic associated with user device 210 and may examine packets (e.g., using deep packet inspection (DPI) techniques, and/or other inspection techniques) associated with the traffic. UIDH device 230 may obtain the identifier, associated with the user, from the packets. UIDH device 230 may also, or alternatively, generate a key based on a random number that is generated and/or obtained by UIDH device 230. Additionally, or alternatively, UIDH device 230 may use a mechanism to generate the UIDH based on the identifier and/or the key. The mechanism may, for example, correspond to a cryptographic hash function, such as a one-way cryptographic hash function (e.g., a hash-based message authentication code (HMAC) secure hash algorithm (SHA) HMAC-SHA-256, etc.), and/or some other mathematical function. The UIDH may be valid for a period of time after which the UIDH may expire. UIDH device 230 may store the UIDH in the request to create a modified request to be provided to server 240 and/or authentication server 220. UIDH device 230 may also, or alternatively, associate the UIDH with the identifier and may store the UIDH and/or the identifier in a data structure within database 225.

Server 240 may include one or more server devices, or other types of computation and communication devices, that provide content. For example, server 240 may host a website that can be accessed, by user device 210, to receive content (e.g., web pages, video, audio, images, advertising content, text, data, and/or some combination thereof), and/or a service (e.g., a banking service, an electronic sales transaction service, etc.). Server 240 may provide the content and/or service to user device 210 when a notification is received, from authentication server 220, indicating that a user, of user device 210, is authenticated. Server 240 may, also, or alternatively, host an application that communicates with authentication server 220 to authenticate the user.

Network 250 may include one or more wired and/or wireless networks. For example, network 250 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another network. Additionally, or alternatively, network 250 may include a wide area network (WAN), a metropolitan area network (MAN), an ad hoc network, an intranet, the Internet, a fiber optic-based network, and/or a combination of these or other types of networks.

FIG. 3 is a diagram of example components of a device 300 that may correspond to user device 310, authentication server 320, UIDH device 330, and/or server device 340. Alternatively, each of user device 310, authentication server 320, UIDH device 330, and/or server device 340 may include one or more devices 300. Device 300 may include a bus 310, a processor 320, a memory 330, an input component 340, an output component 350, and a communication interface 360. Although FIG. 3 shows example components of device 300, in other implementations, device 300 may contain fewer components, additional components, different components, or differently arranged components than depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Bus 310 may include a path that permits communication among the components of device 300. Processor 320 may include one or more processors, microprocessors, or processing logic that may interpret and execute instructions. Memory 330 may include any type of dynamic storage device that may store information and instructions, for execution by processor 320, and/or any type of non-volatile storage device that may store information for use by processor 320.

Input component 340 may include a mechanism that permits a user to input information to device 300, such as a keyboard, a keypad, a button, a switch, a touchscreen display, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include mechanisms for communicating with another device or system via a network, such as service provider network 360 and/or network 170. In one alternative implementation, communication interface 360 may be a logical component that includes input and output ports, input and output systems, and/or other input and output components that facilitate the transmission of data to other devices.

As described herein, device 300 may perform certain operations associated with authentication using a UIDH. Device 300 may perform these operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4A:
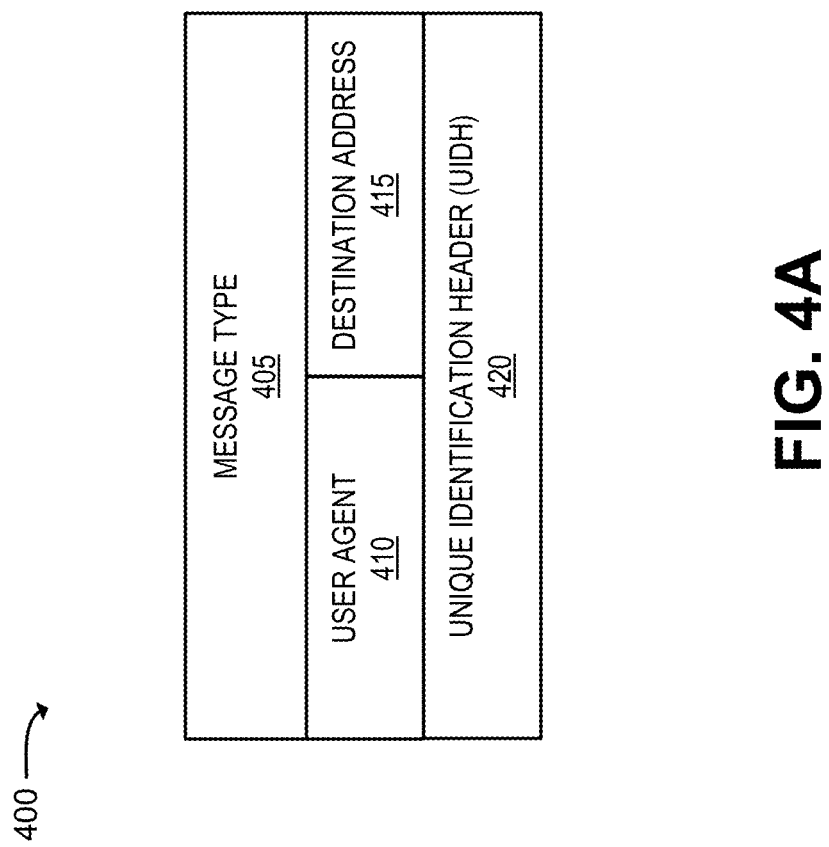
FIG. 4A is a diagram of a request to receive a service, from an authentication server, that includes a unique identification header (UIDH)

FIG. 4A is a diagram of a request 400 to receive a service, from authentication server 220, that includes a UIDH. In one example, request 400 may correspond to a hypertext transfer protocol (HTTP) request that is transmitted from user device 210, via UIDH device 230, to authentication server 220. The HTTP request may be modified, by UIDH device 230, by inserting a UIDH into a packet (e.g., a packet header, trailer, payload, etc.) associated with the HTTP request to create request 400. UIDH device 230 may provide request 400 to authentication server 220. As shown in FIG. 4A, request 400 may include a collection of fields, such as a message type field 405, a user agent field 410, a destination address field 415, and a unique identification header (UIDH) field 420. Fields 405-420, within request 400, are provided for explanatory purposes only. In practice, request 400 may include additional fields, fewer fields, different fields, and/or differently arranged fields than are described with respect to request 400. Additionally, or alternatively, while the description below describes request 400 as an HTTP request, in other examples, request 400 may corresponds to a different type of request (e.g., a short message peer-to-peer (SMPP) request, a session initiation protocol (SIP) request, etc.).

Message type field 405 may store information that identifies a type of message. For example, message type field 405 may store information that indicates that a packet, in which request 400 is stored, is associated with a request for to access a service (e.g., an HTTP request, a SIP request, a SMPP request, etc.). User agent field 410 may store information that identifies a type of user device 210 and/or a browser, running on user device 210, from which the request was sent. Destination address field 415 may store information that identifies server 240 from which content is being requested. For example, the information that identifies server 240 may correspond to a uniform resource locator (URL) and/or some other network address associated with server 240. UIDH field 420 may store a UIDH, associated with user device 210, that has been inserted, by UIDH device 230, into a request (e.g., into request 400 associated with the request) to create a modified request.

Figure 4B:
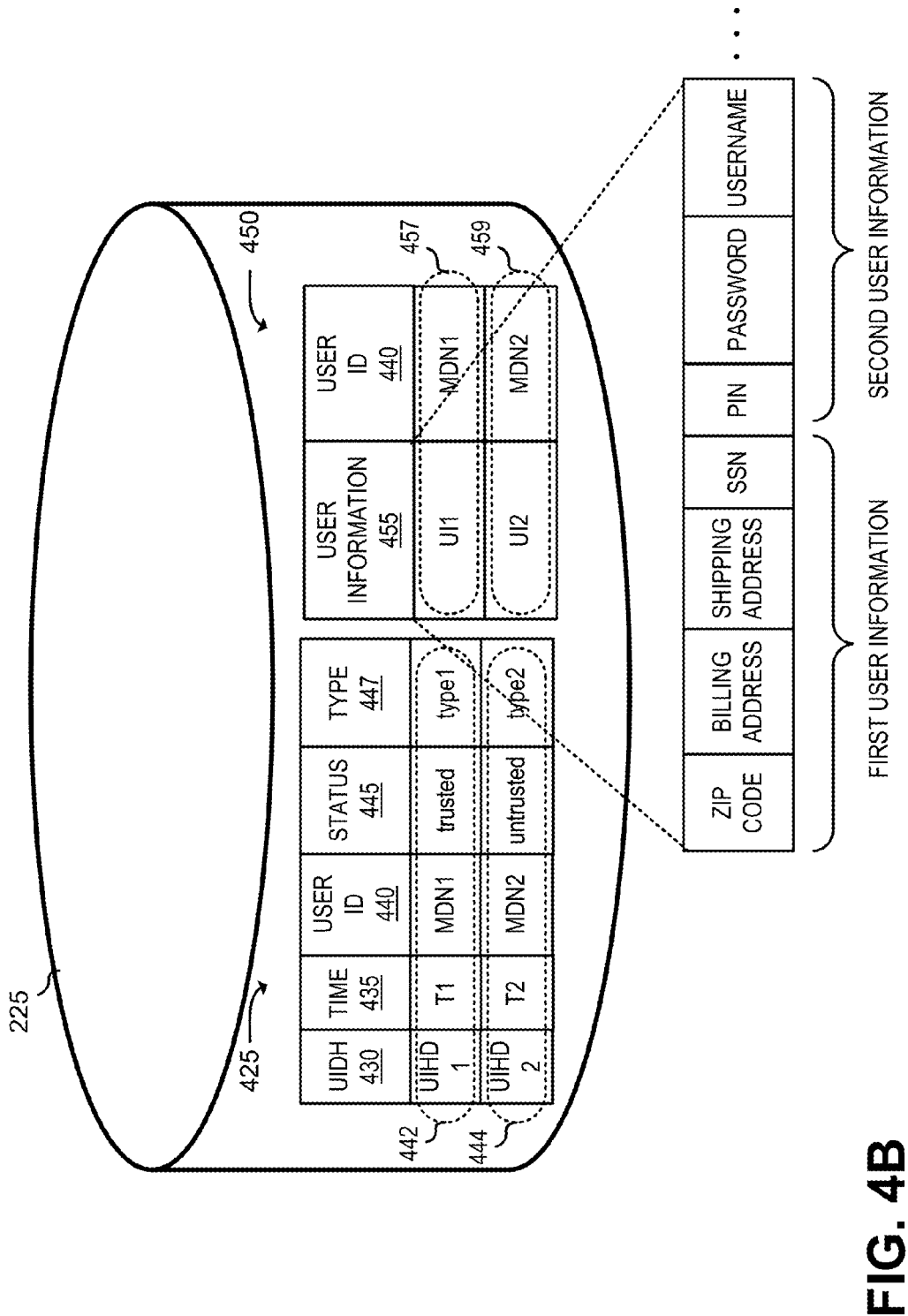
FIG. 4B is a diagram of data structures that store authentication credentials associated with a user device and/or a user of the user device.

FIG. 4B is a diagram of data structures 425 and 450 that store authentication credentials associated with user device 210 and/or a user of user device 210. In one example, data structure 425 and/or 450 may be stored in database 225. As shown in FIG. 4B, data structure 425 may include a collection of fields, such as unique identification header (UIDH) field 430, a time field 435, a user identifier (ID) field 440, a status field 445, and a type field 447. As also shown in FIG. 4B, data structure 450 may include a collection of fields, such as user ID field 440 and a user information field 455. Fields 430-447 and fields 440 and 455 within data structures 425 and 450, respectively, are provided for explanatory purposes only. In practice, data structures 425 and/or 450 may include additional fields, fewer fields, different fields, and/or differently arranged fields than are described with respect to data structures 425 and 450.

UIDH field 430 may store a UIDH that is generated by UIDH device 230 when processing a request to access a service. Time field 435 may store information that identifies a time at which the UIDH expires (e.g., 1 hour, 12 hours, 1 day, 3 days, 7 days, 14 days, etc.). User ID field 440 may store an identifier associated with a user associated with a service provider that maintains data structures 425 and 450. The identifier may, for example, include a MDN, a landline director number (LDN), a subscriber identity module (SIM) uniform resource identifier (URI), a mobile identification number (MIN), an international mobile subscriber identity (IMSI), a mobile subscriber integrated services digital network (MSISDN) identifier, a national access identifier (NAI), etc. The identifier, associated with the user, may be portable, which may enable the user to use more than one user device 210 to communicate with network 250 over a time period. For example, the user may use a first user device 210 to communicate with network 250 by associating the identifier with the first user device 210 (e.g., by inserting a SIM card, with which the identifier is associated, into the first user device 210). Additionally, or alternatively, the user may use a second user device 210 to communicate with network 250 by associating the identifier with the second user device 210 (e.g., by inserting the SIM card, with which the identifier is associated, into the second user device 210). Status field 445 may store information that identifies whether an identifier, stored in user ID field 440, is trusted or not trusted. Type field 447 may store information that indicates whether the identifier is associated with two or more users. In one example, the identifier may be associated with two or more users when the identifier corresponds to a type of user device 210 (e.g., a MiFi device, etc.) via which one or more other user devices 210 communicate.

By way of example, UIDH device 230 may receive a request for a service and may obtain an identifier, associated with a user, based on the request. UIDH 230 may store, in data structure 425, the identifier, associated with the user (e.g., MDN1), a UIDH (e.g., UIDH1) that UIDH device 230 generates based on the identifier, and a time (e.g., T1) at which the UIDH is set to expire (e.g., as shown by ellipse 442). Additionally, or alternatively, UIDH device 230 may communicate with a server device that provides a service that identifies whether identifiers, associated with users, are trusted or not trusted and/or whether the identifier corresponds to a particular type of user device 210 associated with two or more users. UIDH device 230 may, for example, store an indication that the identifier is trusted (e.g., shown as "trusted" by ellipse 442) when UIDH device 230 receives an indication that MDN1 is trusted. UIDH device 230 may also, or alternatively, store an indication that the identifier is not associated with a particular type of user device 210 (e.g., shown as "type1" by ellipse 442). Additionally, or alternatively, UIDH device 230 may process other requests and may store other information that is obtained and/or generated as a result of processing the other requests (e.g., as shown by ellipse 444).

User information field 455, of data structure 450, may store user information associated with the user. The user information may, for example, represent a second factor of authentication that can be represented by something that the user knows and/or provides, via user device 210, when prompted by authentication server 220. For example, user information field 455 may store first user information that includes information that is known to the user, such as a zip code, a billing address, a shipping address, all or a portion of a social security number, an identifier associated with user device 210 (e.g., a MDN, etc.), etc. Additionally, or alternatively, user information field 455 may store second user information that includes information that is possessed by the user, such as a PIN, a password, a username, etc.

By way of example, authentication server 220 may receive a request to register from user device 210. Authentication server 220 may obtain from the user, via user device 210, user information (e.g., UI1). Authentication server 220 may also, or alternatively, associate the user information with an identifier (e.g., MDN1) that was assigned to the user when the user subscribed with the service provider. Authentication server 220 may also, or alternatively, store the user information (e.g., UI1) and/or the identifier (e.g., MDN1) in data structure 450 (e.g., as shown by ellipse 457). Additionally, or alternatively, authentication server 220 may register other users and may store other user information and/or another identifiers in data structure 450 (e.g., as shown by ellipse 459).

Figure 5A:
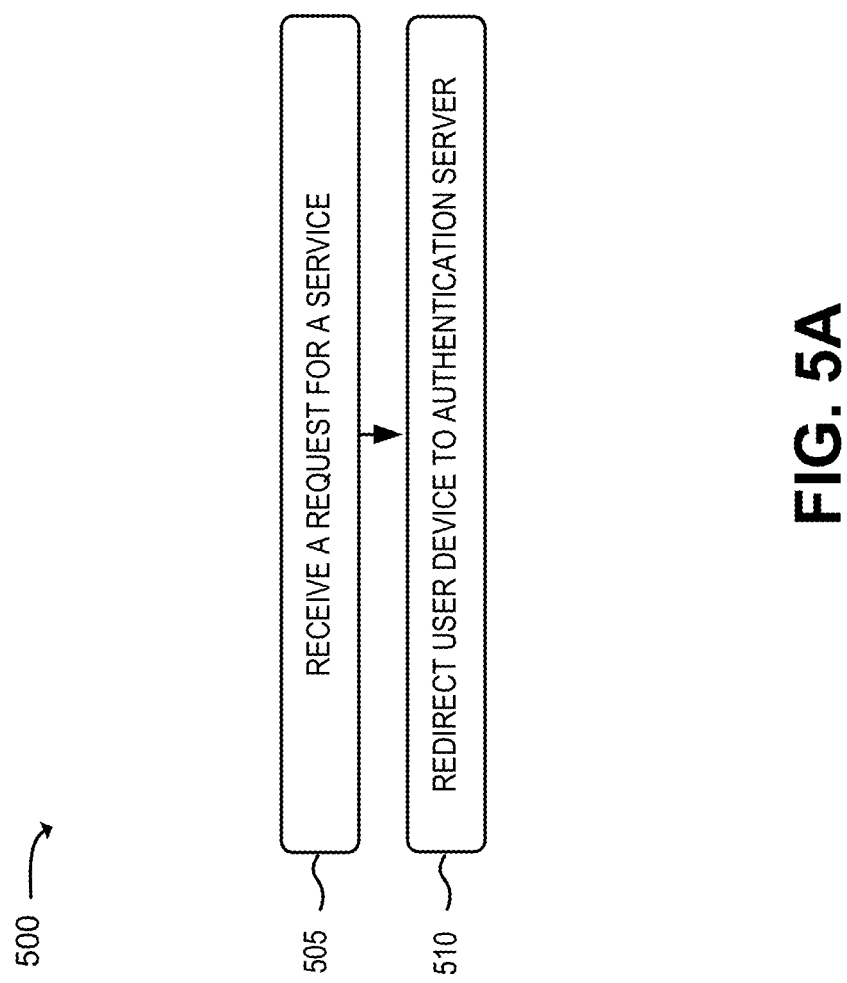
FIG. 5A is a flow chart of an example process for redirecting a request for access to an authentication server.

FIG. 5A is a flow chart of an example process 500 for redirecting a request for access to authentication server 220. In one example implementation, process 500 may be performed by server 240 and/or user device 210. In another example implementation, some or all of process 500 may be performed by a device or collection of devices separate from, or in combination with, server 240 and/or user device 210.

As shown in FIG. 5A, process 500 may include receiving a request for a service (block 505) and redirecting a user device to an authentication server (block 510). For example, server 240 may receive, from user device 210, a request to access a service and may determine that a user, associated with device 210, is to be authenticated prior to providing access to the service. The application may, for example, cause server 240 to transmit an instruction, to user device 210, to communicate with authentication server 220. In one example, the instruction may correspond to an HTTP instruction that causes user device 210 to communicate with authentication server 220 using an address (e.g., a URL, an Internet protocol (IP) address, etc.) associated with authentication server 220. User device 210 may receive the instruction and may communicate with authentication server 220 using the address. Authentication server 220 may perform an authentication operation to authenticate the user, and/or user device 210, in a manner to be described in greater detail below with respect to FIG. 5B. Authentication server 220 may transmit a notification, to server 240, indicating whether the user is authenticated.

Additionally, or alternatively, an application, hosted by user device 210, may determine that a user, of user device 210, is interacting with user device 210 to access the application. The application may determine that the user is to be authenticated prior to permitting the user to access the application. The application may, for example, cause user device 210 to communicate with authentication server 220. Authentication server 220 may, based on the communication, perform an authentication operation on the user in a manner to be described in greater detail below with respect to FIG. 5B. Authentication server 220 may transmit, to user device 210, a notification indicating whether the user is authenticated.

Figure 5B:
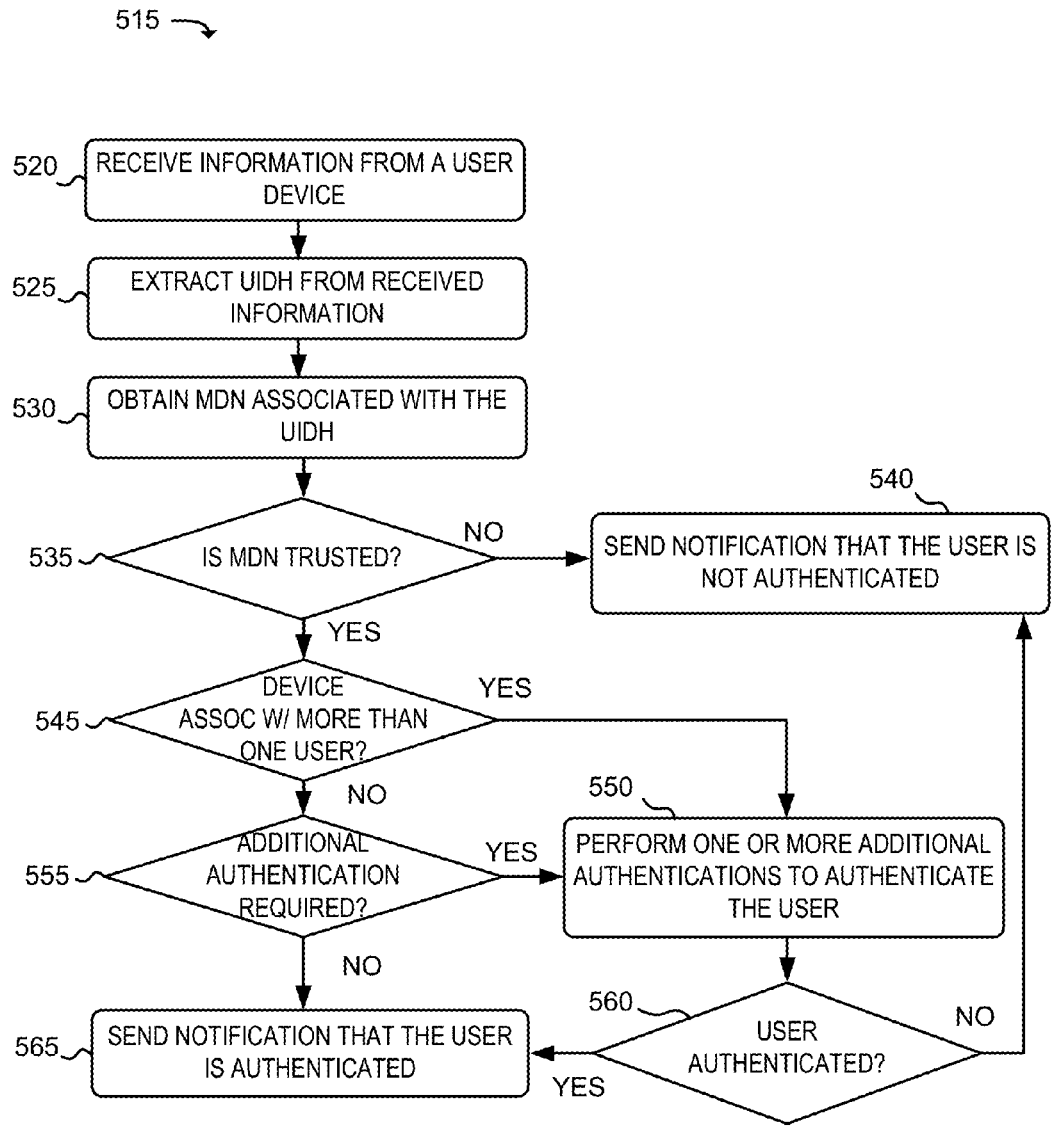
FIG. 5B is a flow chart of an example process for authenticating a user using a UIDH.

FIG. 5B is a flow chart of an example process 515 for authenticating a user using a UIDH. In one example implementation, process 515 may be performed by authentication server 220. In another example implementation, some or all of process 515 may be performed by a device or collection of devices separate from, or in combination with, authentication server 220.

As shown in FIG. 5B, process 515 may include receiving information from a user device (block 520). Assume, in a manner similar to that described above with respect to FIG. 5A, that user device 210 receives, from server 240, an instruction to communicate with authentication server 220 in response to a request to receive a service. User device 210 may, as a result of receiving the instruction, provide request information, associated with the request to receive the service, to UIDH device 230. The request information may, in one example, correspond to an HTTP request (e.g., based on the HTTP protocol). Additionally, or alternatively, the request information may correspond to a request based on a protocol other than HTTP (e.g., file transfer protocol (FTP), simple FTP, simple mail transfer protocol, etc.). Additionally, or alternatively, the request information may include a destination address (e.g., associated with server 240), a source address (e.g., associated with user device 210), information associated with a user agent (e.g., that identifies a type device and/or browser from which the information, associated with the request, is received), and/or an identifier associated with a user. In the description below, the identifier, associated with the user, is described as an MDN associated with the user. In another example implementation, the identifier may correspond to one or more of the identifiers, associated with the user, discussed with respect to user ID field 440 of FIG. 4B.

UIDH device 230 may receive the request information and may extract the MDN from the request information (e.g., from a field associated with a packet header, trailer, payload, etc.). UIDH device 230 may also, or alternatively, generate or obtain a random value and may use a mechanism (e.g., a cryptographic hash function and/or some other mathematical function) to generate a key, based on the random value, that is valid for a time period. Additionally, or alternatively, UIDH device 230 may use another mechanism (e.g., another cryptographic hash function and/or some other mathematical function) to generate a UIDH, associated with the user, based on the MDN and the key. The UIDH may, for example, be valid as long as the key is valid. UIDH device 230 may also, or alternatively, store the UIDH in the request information (e.g., a field associated with a packet header, trailer, payload, etc.), to create modified information. UIDH device 230 may also, or alternatively, transmit the modified information to authentication server 220 and authentication server 220 may receive the modified information.

Additionally, or alternatively, UIDH device 230 may receive the request information from user device 210 and may create the modified information in a manner described above. UIDH device 230 may also, or alternatively, transmit the modified information to server 240. In this example, server 240 may redirect user device 210 to communicate with authentication server 220 and user device 210 may provide the modified information directly to authentication server 220. Additionally, or alternatively, authentication server 220 may receive the request information (e.g., that does not include the UIDH), and may instruct user device 210 to communicate with UIDH device 230 to cause the UIDH to be inserted in the request information to create the modified information in a manner similar to that described above. UIDH device 230 may provide the modified information to authentication server 220 and authentication server may receive the modified information.

As also shown in FIG. 5B, process 515 may include extracting a UIDH from the received information (block 525) and obtaining an MDN associated with the UIDH (block 530). For example, authentication server 220 may extract the UIDH from the modified information and may identify an MDN with which the UIDH is associated. Authentication server 220 may, for example, perform a lookup operation by identifying whether a UIDH, stored within database 225 (e.g., in field 430 of data structure 425), matches the UIDH extracted from the modified information. When the stored UIDH does not match the extracted UIDH, authentication server 220 may determine that the user cannot be authenticated.

When the stored UIDH matches the extracted UIDH, authentication server 220 may obtain, from database 225 (e.g., field 435 of data structure 425 of FIG. 4B), information that identifies a time at which the UIDH expires. Authentication server 220 may determine that the UIDH has expired when a current time is after the time at which UIDH expires. When the UIDH has expired, authentication server 220 may determine that the user cannot be authenticated.

When the user cannot be authenticated, authentication server 220 may provide an authentication response, to user device 210 and/or server 240, indicating that the user cannot be authenticated. Server 240 may receive the authentication response and may not provide the service to user device 210. User device 210 may receive the authentication response and may communicate with UIDH device 230 to cause another UIDH to be generated, inserted into the request information to create modified information, and/or provide the modified information to authentication server 220.

When the stored UIDH matches the extracted UIDH and when the UIDH has not expired, authentication server 220 may retrieve, from database 225 (e.g., from field 440 of data structure 425), a MDN, associated with a user, to which the stored UIDH corresponds.

As further shown in FIG. 5B, if the MDN is not trusted (block 535—NO), process 515 may include sending a notification that the user is not authenticated (block 540). For example, authentication server 220 may determine whether the MDN is trusted. In one example, authentication server 220 may retrieve, from database 225 (e.g., field 445 of data structure 425 of FIG. 4B), an indicator that identifies whether the MDN is trusted. The indicator may, for example, be provided by UIDH device 230 when the MDN is used to generate the UIDH. Authentication server 220 may, for example, determine that the user cannot be authenticated when the indicator identifies that the MDN is untrusted.

Additionally, or alternatively, authentication server 220 may communicate with a server device that provides a service that identifies whether the MDN is trusted. Authentication server 220 may, for example, provide the MDN to the server device and may receive an indicator, from the server device, that identifies whether the MDN is trusted. Authentication server 220 may, for example, determine that the user cannot be authenticated when the indicator identifies that the MDN is not trusted. When the indicator identifies that the MDN is not trusted, authentication server 220 may provide an authentication response, to server 240 and/or user device 210, indicating that the user, associated with the MDN, cannot be authenticated.

As still further shown in FIG. 5B, if the MDN is trusted (block 535—YES) and if the user device is associated with more than one user (block 545—YES), process 515 may include performing one or more additional authentications to authenticate the user (block 550). For example, authentication server 220 may determine that the MDN is trusted when the indicator, retrieved from database 225, indicates that the MDN is trusted. Additionally, or alternatively, authentication server 220 may communicate with the server device that provides the service that identifies whether the MDN is trusted. Authentication server 220 may, for example, provide the MDN to the server device and may receive an indicator, from the server device, that indicates that the MDN is trusted.

Based on the determination that the MDN is trusted, authentication server 220 may determine whether user device 210 is associated with two or more users, such as, for example, when user device 210 corresponds to a type of user device 210 (e.g., a MiFi device, etc.) via which one or more other user devices 210 communicate. In one example, authentication server 220 may retrieve, from database 225, an indication, associated with the MDN, that identifies whether user device 210 corresponds to a type of user device 210 via which one or more other user devices 210 communicate. Authentication server 220 may determine that user device 210 is associated with two or more users when the indication identifies that user device 210 corresponds to the type of user device 210 via which one or more other user devices 210 communicate. Additionally, or alternatively, authentication server 220 may communicate with a server device that provides a service that identifies whether user devices 210 are associated with two or more users. Authentication server 220 may, for example, provide the MDN to the server device and may receive an indicator, from the server device, that indicates that user device 210 is associated with two or more users.

Based on the determination that the MDN is trusted and that user device 210 is associated with two or more users, authentication server may perform one or more additional authentications to authenticate the user. The one or more additional authentication operations may include authenticating the user by obtaining first user information (e.g., zip code, business address, shipping address, all or part of a SSN, etc.), via user device 210, from the user and authenticating the user based on the first user information. Additionally, or alternatively, the additional authentication operations may include authenticating the user by obtaining second user information (e.g., a PIN, password, username, etc.), via user device 210, from the user and authenticating the user based on the second user information. Additionally, or alternatively, the additional authentication operations may include authenticating the user by obtaining biometric information associated with the user (e.g., a facial image, a fingerprint, a voice recording of the user, etc.), via user device 210, from the user and authenticating the user based on the biometric information. The one or more additional authentication operations will be described in greater detail below with respect to FIG. 6.

As also shown in FIG. 5B, if the user device is not associated with more than one user (block 545—NO), and if an additional authentication is desired (block 555—YES), process 515 may include performing one or more additional authentications to authenticate the user (block 550). For example, when the MDN is trusted, authentication server 220 may retrieve, from database 225, an indication, associated with the MDN, that identifies that user device 210 does not correspond to the type of user device 210 via which one or more other user devices 210 communicate. Additionally, or alternatively, authentication server 220 may communicate with the server device that provides the service that identifies whether user devices 210 are associated with two or more users. Authentication server 220 may, for example, provide the MDN to the server device and may receive an indicator, from the server device, that indicates that user device 210 is not associated with two or more users.

Based on the determination that user device 210 is not associated with two or more users, authentication server 220 may determine whether an additional authentication is required. For example, authentication server 220 may obtain an agreement (e.g., a service level agreement, etc.) between administrators associated with authentication server 220 and server 240, to determine whether to perform the additional authentications. When the agreement indicates that server 240 desires one or more additional authentications to be performed, authentication server 220 may perform the additional authentication operations in a manner similar to that described above. The one or more additional authentication operations will be described in greater detail below with respect to FIG. 6.

As further shown in FIG. 5B, if the user is not authenticated (block 560—NO), process 515 may include sending a notification that the user is not authenticated (block 540). For example, authentication server 220 may determine that an authentication operation, performed on the user, indicates that the user is not authenticated. When the user is not authenticated, authentication server 220 may provide an authentication response to server 240 indicating that the user is not authenticated. Server 240 may receive the authentication response and may not provide the service to user device 210. Additionally, or alternatively, authentication server 220 may provide the authentication response to user device 210 indicating that the user is not authenticated.

As yet further shown in FIG. 5B, if the user is authenticated (block 560—YES) or if an additional authentication is not required (block 555—NO), process 515 may include sending a notification that the user is authenticated (block 565). For example, authentication server 220 may determine whether the user is authenticated based on one or more of the additional authentication operations. When each of the authentication operations, performed on the user, indicate that the user is authenticated, authentication server 220 may provide an authentication response to server 240 indicating that the user is authenticated. Server 240 may receive the authentication response and may provide the service to user device 210.

Additionally, or alternatively, when user device 210 is not associated with two or more users, authentication server 220 may determine whether an agreement indicates that an additional authentication is required. For example, authentication server 220 may obtain the agreement (e.g., a service level agreement, etc.) between administrators associated with authentication server 220 and server 240, and may determine that the agreement indicates the additional authentications are not to be performed. When the additional authentications are not to be performed, authentication server 220 may provide an authentication response to server 240 indicating that the user is authenticated. Server 240 may receive the authentication response and may provide the service to user device 210.

Figure 5C:
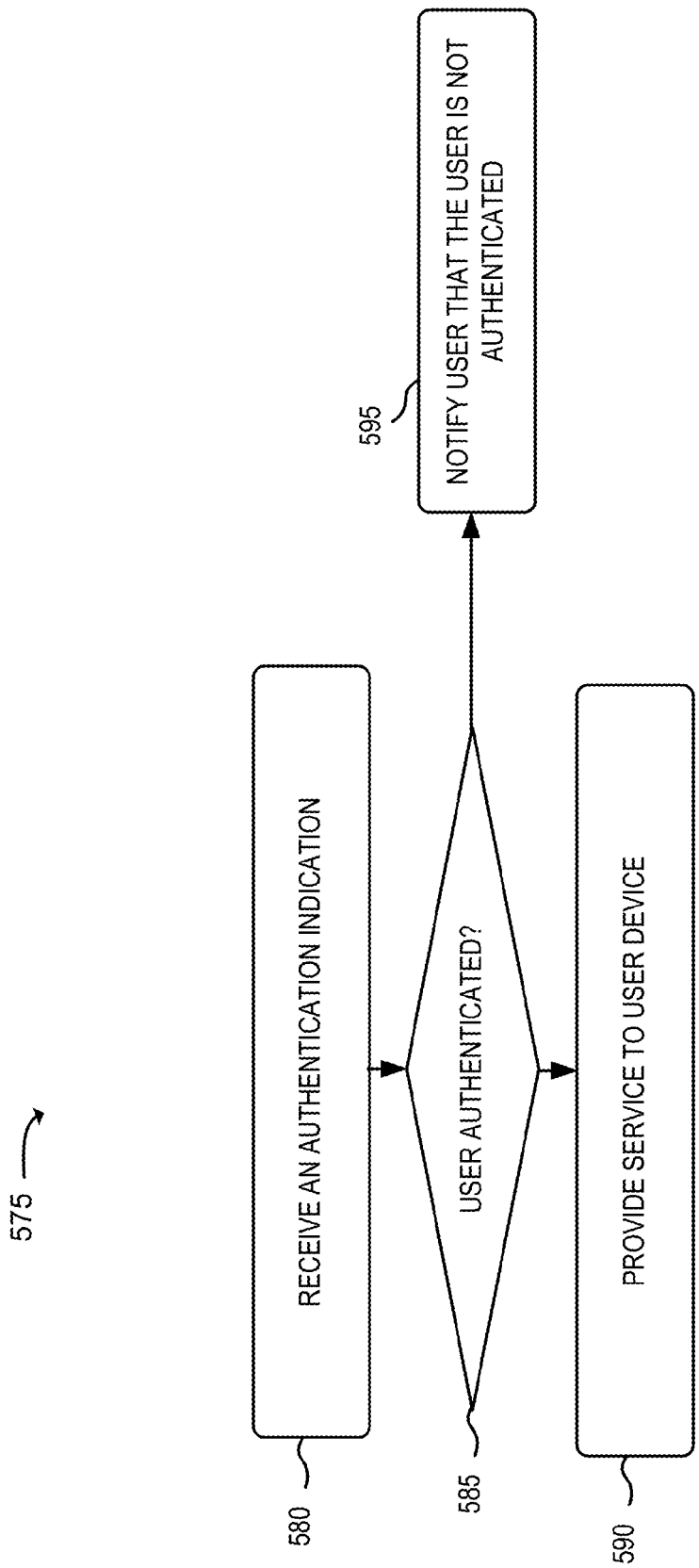
FIG. 5C is a flow chart of an example process for providing a service as a result of receiving an indication that a user is authenticated.

FIG. 5C is a flow chart of an example process 575 for providing a service as result of receiving an indication that a user is authenticated. In one example implementation, process 575 may be performed by server 240 and/or user device 210. In another example implementation, some or all of process 575 may be performed by a device or collection of devices separate from, or in combination with, server 240 and/or user device 210.

As shown in FIG. 5C, process 575 may include receiving an authentication indication (block 580). For example, server 240 may receive, from authentication server 220, an indication indicating whether a user, associated with user device 210 from which a request to access a service was received, is authenticated.

Additionally, or alternatively, user device 210 may receive, from authentication server 220, an indication indicating whether a user from which a request to access an application (e.g., hosted by user device 210) was received, is authenticated.

If the user is authenticated (block 585-YES), process 575 may include providing the service to a user device (block 590). For example, server 240 may determine that the indication indicates that the user is authenticated. When the indication indicates that the user is authenticated, server 240 may provide the service to user device 210.

Additionally, or alternatively, user device 210 may determine that the indication, received from authentication server 220, indicates that the user is authenticated. When the indication indicates that the user is authenticated, device 210 may permit the user to access the application.

If the user is authenticated (block 585—NO), process 575 may include notifying the user that the user is not authenticated (block 595). For example, server 240 may determine that the indication indicates that the user is not authenticated. When the indication indicates that the user is not authenticated, server 240 may not provide the service to user device 210 and/or may provide a notification, to user device 210, that the user is not authenticated.

Additionally, or alternatively, user device 210 may determine that the indication, received from authentication server 220, indicates that the user is not authenticated. When the indication indicates that the user is not authenticated, device 210 may not permit the user to access the application and/or may display a notification that indicates that the user is not authenticated.

Figure 6:
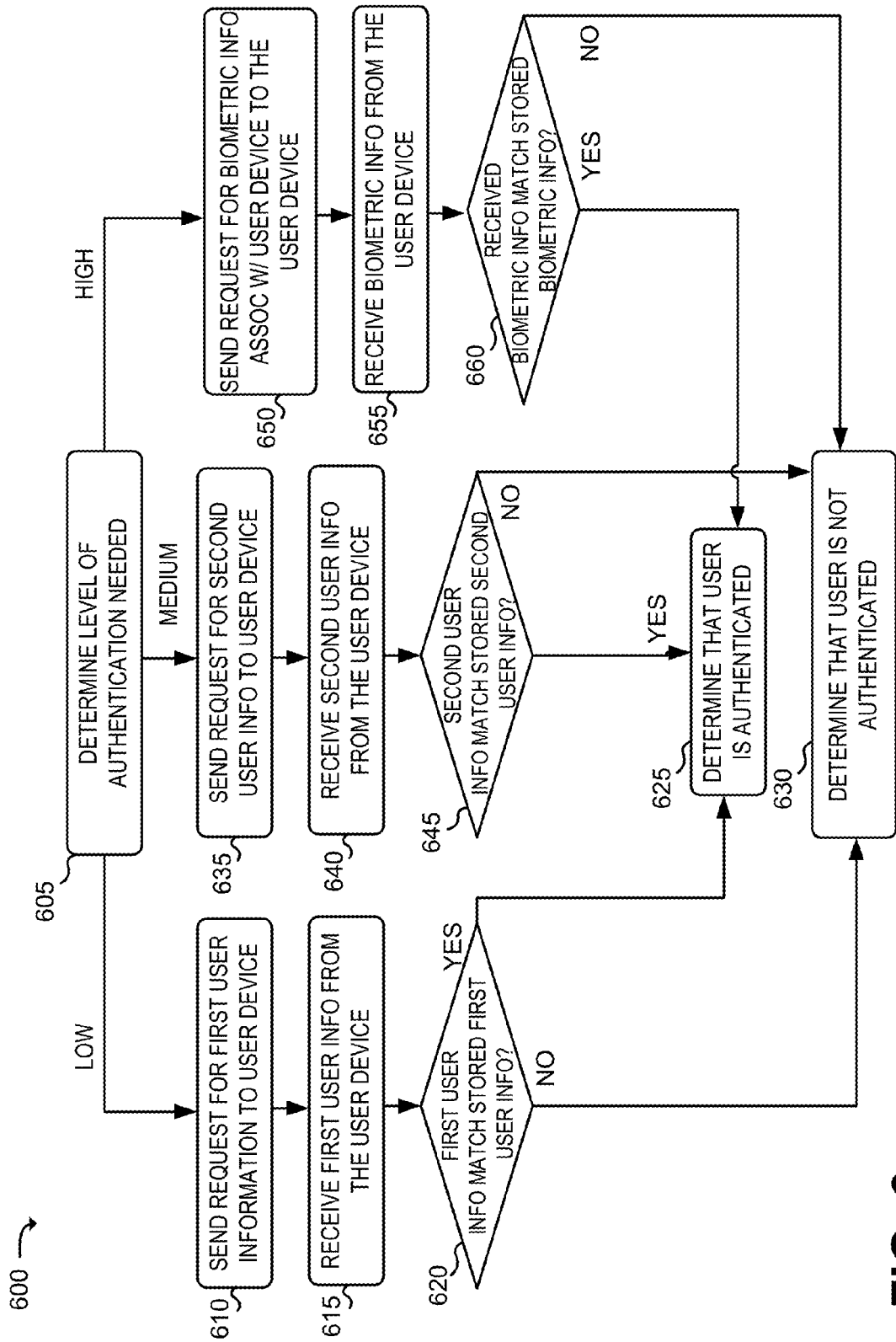
FIG. 6 is a flow chart of an example process for authenticating a user based on a level of authentication determined by an authentication server.
Figure 7:
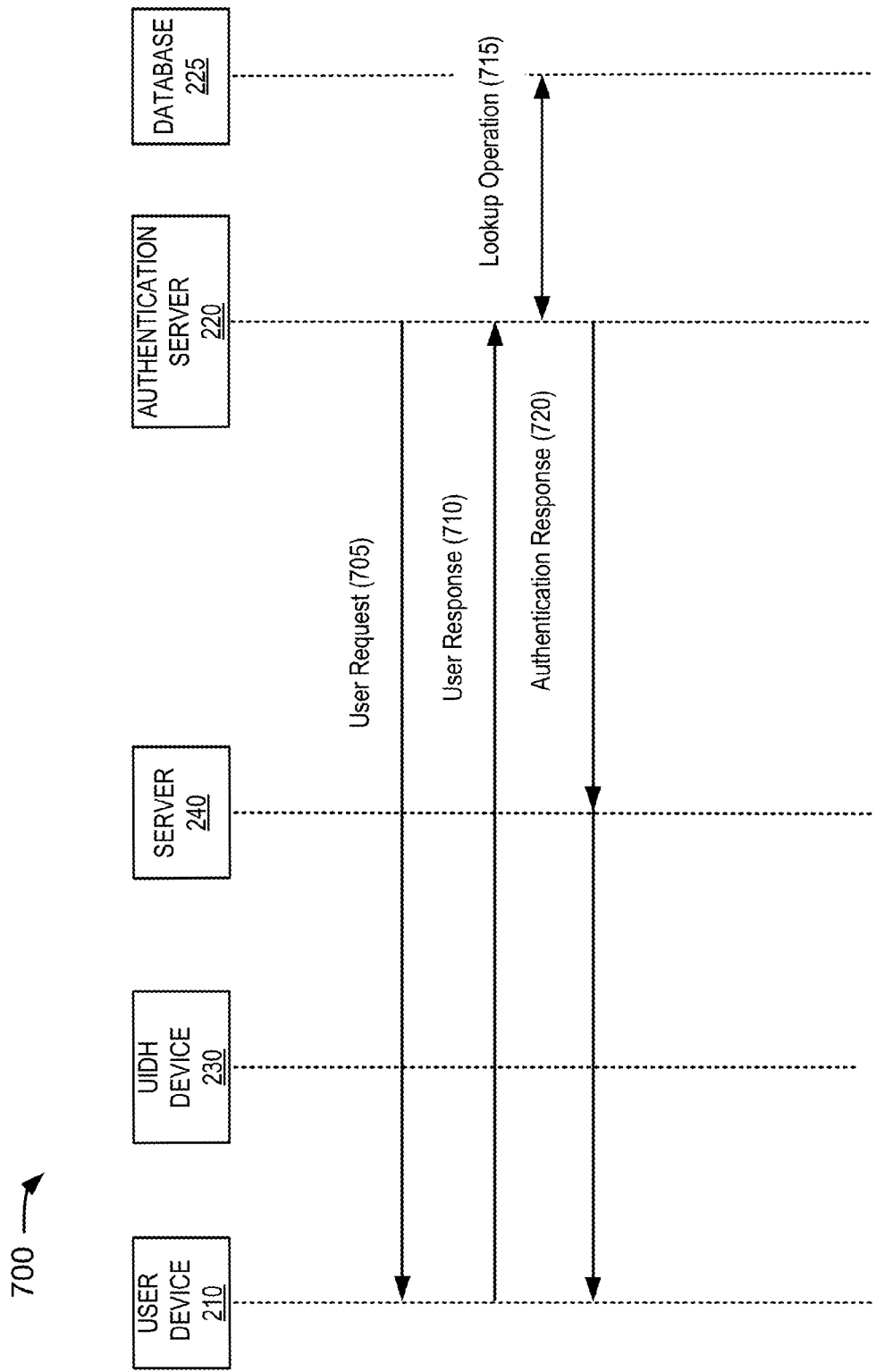
FIG. 7 is a diagram of an example signal flow, between devices of an example portion of the environment of FIG. 1.

FIG. 6 is a flow chart of an example process 600 for authenticating a user based on a level of authentication determined by authentication server 220. Process 600 may correspond to block 555 of FIG. 5B. In one example implementation, process 600 may be performed by authentication server 220. In another example implementation, some or all of process 600 may be performed by a device or collection of devices separate from, or in combination with, authentication server 220. FIG. 7 is a diagram of an example signal flow, between devices of an example portion 700 of environment 200. As illustrated in FIG. 7, example portion 700 may include user device 210, authentication server 220, database 225, UIDH device 230, and server 240. User device 210, authentication server 220, database 225, UIDH device 230, and server 240 may include the features described above in connection with one or more of FIGS. 2 and 3. In the description below, a portion process 600 of FIG. 6 will be described with references to example portion 700 of FIG. 7.

As shown in FIG. 6, process 600 may include determining a level of authentication that is needed (block 605). For example, authentication server 220 may identify a level of authentication (e.g., low, medium, high, etc.) that is to be used for a user of user device 210. In one example, the level of authentication may be determined based on a service level agreement, associated with server 240, that indicates the level of authentication. Additionally, or alternatively, the level of authentication may be based on the type of network via which user device 210 is communicating. For instance, authentication server 220 may determine that a low level of authentication is to be used when user device 210 is communicating via a first, trusted WLAN and/or is located within service area associated with the first WLAN. Additionally, or alternatively, authentication server 220 may determine that another level of authentication (e.g., medium, high, etc.) is to be used when the user device 210 is communicating with a second, untrusted WLAN and/or is located within a service area associated with the second WLAN.

As also shown in FIG. 6, when the determined level of authentication is low, process 600 may include sending a request for first user information, to the user device (block 610) and receiving first user information from the user device (block 615). For example, when the determined level of authentication is low, authentication server 220 may transmit, to user device 210, a user request 705 (FIG. 7). User device 210 may receive user request 705 and an application, hosted by user device 210, may cause a user interface to be displayed on user device 210. The user interface may include one or more fields that enables the user to enter first user information (e.g., a zip code, a full or partial shipping and/or billing address, a portion of a social security number, etc. and/or any combination thereof). In one example, the request may identify specific user information to be entered via the user interface (e.g., please enter your zip code, etc.). Additionally, or alternatively, the request may identify a combination of user information to be entered via the user interface (e.g., please enter your zip code and the last four digits of your SSN, etc.) The user interface will be described in greater detail below with respect to FIG. 8.

Additionally, or alternatively, user device 210 may receive, via the user interface, the first user information and may provide a user response 710 (FIG. 7), to authentication server 220, that includes the first user information. Authentication server 220 may receive user response 710 and may obtain the first user information from user response 710.

If the first user information matches stored first user information (block 620—YES), process 600 may include determining that the user is authenticated (block 625). For example, authentication server 220 may perform a lookup operation 715 (FIG. 7) to identify first user information, stored within database 225 (e.g., in field 455 of data structure 450 of FIG. 4B), that corresponds to a MDN associated with the user. Authentication server 220 may also, or alternatively, compare the stored first user information with the first user information received from user response 710. When the stored first user information matches the received first user information, authentication server 220 may provide authentication response 720, to server 240, indicating that the user is authenticated. Server 240 may receive authentication response 720 and may provide the service to user device 210.

If the first user information does not match the stored first user information (block 620—NO), process 600 may include determining that the user is not authenticated (block 630). For example, authentication server 220 may determine that the stored first user information does not match the received first user information based on the comparison of the stored first user information to the received first user information. When the stored first information does not match the received first user information, authentication server 220 may provide authentication response 720, to server 240 and/or user device 210, indicating that the user cannot be authenticated. Server 240 may receive authentication response 720 and may not provide the service to user device 210.

As further shown in FIG. 6, when the determined level of authentication is medium, process 600 may include sending a request for second user information, to the user device (block 635) and receiving second user information from the user device (block 640). For example, when the determined level of authentication is medium, authentication server 220 may transmit, to user device 210, user request 705 (FIG. 7). User device 210 may receive user request 705 and an application, hosted by user device 210, may cause a user interface to be displayed on user device 210. The user interface may include one or more fields that enables the user to enter second user information (e.g., a PIN, a password, a username, etc.) and, possibly, first user information (e.g., a zip code, a full or partial shipping and/or billing address, a portion of a social security number, etc. and/or any combination thereof). In one example, the request may identify specific second user information to be entered via the user interface (e.g., please enter your PIN, etc.). Additionally, or alternatively, the request may identify a combination of second user information to be entered via the user interface (e.g., please enter your username and PIN, etc.). Additionally, or alternatively, the request may identify specific first user information and second user information to be entered via the user interface (e.g., please enter your zip code and your password, etc.). The user interface will be described in greater detail below with respect to FIG. 8.

Additionally, or alternatively, user device 210 may receive, via the user interface, the second user information and, possibly, the first user information and may provide another user response 710 (FIG. 7), to authentication server 220, that includes the second user information and, possibly, the first user information. Authentication server 220 may receive user response 710 and may obtain the second user information from user response 710.

If the second user information matches stored second user information (block 645—YES), process 600 may include determining that the user is authenticated (block 625). For example, authentication server 220 may perform another lookup operation 715 (FIG. 7) to identify second user information, stored within database 225 (e.g., in field 455 of data structure 450 of FIG. 4B), that corresponds to the MDN associated with the user. Authentication server 220 may also, or alternatively, compare the stored second user information with the second user information received from user response 710. When the stored second user information matches the received second user information, authentication server 220 may provide another authentication response 720, to server 240, indicating that the user is authenticated. Server 240 may receive authentication response 720 and may provide the service to user device 210. Additionally, or alternatively, authentication server 220 may authenticate the user, in the manner described above with respect to block 610-620, based on the first user information received in user response 710.

If the second user information does not match the stored second user information (block 645—NO), process 600 may include determining that the user is not authenticated (block 630). For example, authentication server 220 may determine that the stored second user information does not match the received second user information based on the comparison of the stored second user information to the received second user information. When the stored second user information does not match the received second user information, authentication server 220 may provide another authentication response 720, to server 240 and/or user device 210, indicating that the user cannot be authenticated. Server 240 may receive authentication response 720 and may not provide the service to user device 210. Additionally, or alternatively, authentication server 220 may not authenticate the user, based on the first user information received from user response 710, in a manner similar to that described above with respect to block 610-620.

As also shown in FIG. 6, when the determined level of authentication is high, process 600 may include sending a request for biometric information, associated with the user, to the user device (block 650) and receiving biometric information from the user device (block 655). For example, when the determined level of authentication is high, authentication server 220 may transmit, to user device 210, another user request 705 (FIG. 7). User device 210 may receive user request 705 and an application, hosted by user device 210, may cause a user interface to be displayed on user device 210. The user interface may include an instruction for the user to provide biometric information. The user may use user device 210 (e.g., a camera component, an audio recording component, a fingerprint scanning component, etc.) to record the biometric information, such as, for example, by taking an image or video of the user's face, taking a scan or image of the user's fingerprint, recording the user's voice, etc. or some combination thereof.

Additionally, or alternatively, user device 210 may receive the biometric information and, possibly, the first user information and/or the second user information and may provide another user response 710 (FIG. 7), to authentication server 220, that includes the biometric information and, possibly, the first user information and/or the second user information. Authentication server 220 may receive user response 710 and may obtain the biometric information from user response 710.

If the biometric information matches stored biometric information (block 660—YES), process 600 may include determining that the user is authenticated (block 625). For example, authentication server 220 may perform another lookup operation 715 (FIG. 7) to identify biometric information, stored within database 225 (e.g., in field 455 of data structure 450 of FIG. 4B), that corresponds to the MDN associated with the user. Authentication server 220 may also, or alternatively, compare the stored biometric information with the biometric information received from user response 710. When the stored biometric information matches the received biometric information, authentication server 220 may provide another authentication response 720, to server 240, indicating that the user is authenticated. Server 240 may receive authentication response 720 and may provide the service to user device 210. Additionally, or alternatively, authentication server 220 may authenticate the user, in the manner described above with respect to block 610-620 and/or blocks 635-645, based on the first user information and/or the second user information, respectively, received in user response 710.

If the biometric information does not match the stored biometric information (block 660—NO), process 600 may include determining that the user is not authenticated (block 630). For example, authentication server 220 may determine that the stored biometric information does not match the received biometric information based on the comparison of the stored biometric information to the received biometric information. When the stored biometric information does not match the received biometric information, authentication server 220 may provide another authentication response 720, to server 240 and/or user device 210, indicating that the user cannot be authenticated. Server 240 may receive authentication response 720 and may not provide the service to user device 210. Additionally, or alternatively, authentication server 220 may not authenticate the user, based on the first user information and/or the second user information received from user response 710, in a manner similar to that described above with respect to block 610-620 and/or blocks 635-645, respectively.

Figure 8:
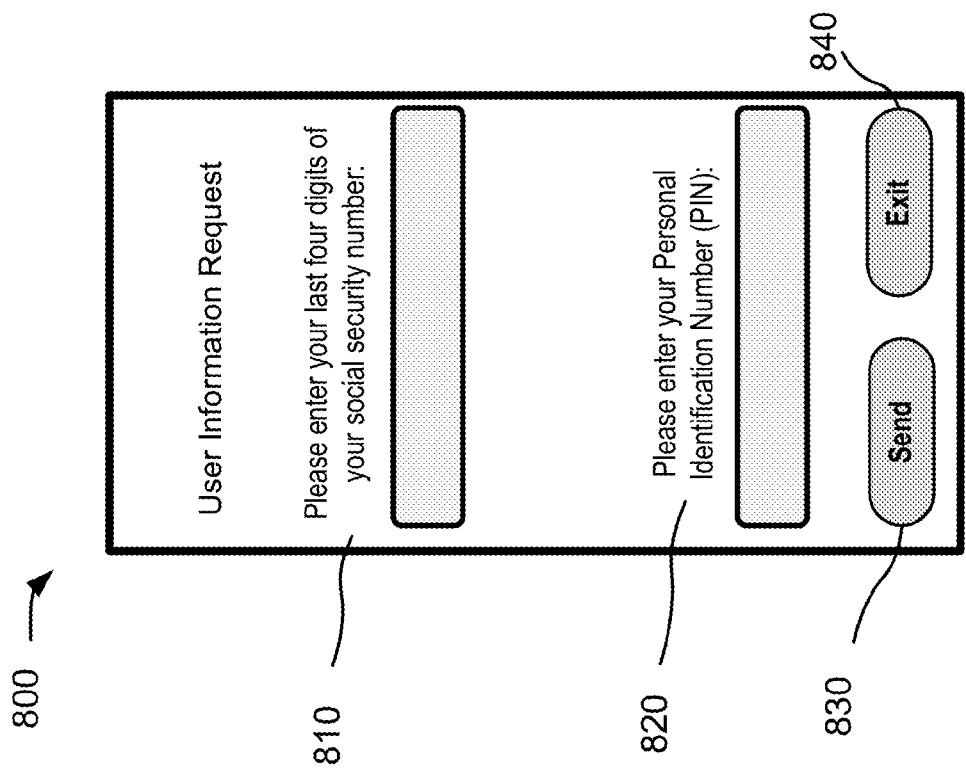
FIG. 8 is an example user interface that enables a user, of a user device, to provide user information that can be used to authenticate the user.

FIG. 8 is an example user interface 800 that enables a user, of a user device 210, to provide user information that can be used to authenticate the user. User interface 800 may be displayed, on user device 210, in a manner similar to that described above with respect to process 600 of FIG. 6. Fields and/or buttons 810 through 840, within user interface 800, are provided for explanatory purposes only. In practice, user interface 800 may include additional fields and/or buttons, fewer fields and/or buttons, different fields and/or buttons, and/or differently arranged fields and/or buttons than are described with respect to user interface 800. For example, when a determined level of authentication is low, in a manner similar to that described above with respect to block 610 of FIG. 6, authentication server 220 may cause user interface 800 to be displayed in a manner that includes first user information field 810. Additionally, or alternatively, when the determined level of authentication is medium or high, in a manner similar to that described above with respect to block 635 or block 650, respectively, of FIG. 6, authentication server 220 may cause user interface 800 to be displayed in a manner that includes second user information field 820 and/or first user information field 810.

As shown in FIG. 8, user interface 800 may include a collection of fields and/or buttons such as a first user information request field 810, a second user information field 820, a send button 830, and an exit button 840. First user information field 810 may permit the user to enter first user information (e.g., a partial SSN, a zip code, a billing address, a shipping address, etc. or some combination thereof). Second user information field 820 may permit the user to enter second user information (e.g., a PIN, a password, a username, etc. or some combination thereof). Send button 830 may, when selected by the user, cause user device 210 to transmit the first user information and/or the second user information to authentication server 220. Exit button 840 may, when selected by the user cause user device 210 to close user interface 800.

By way of example, user device 210 may receive, from authentication server 220, a request for first user information when, as described above, the determined level of authentication is low. User device 210 may, as a result of receiving the request, display user interface 800 that permits the user to enter the first user information (e.g., shown as "Please enter the last four digits of your social security number:" in FIG. 8). Additionally, or alternatively, while FIG. 8 describes the first user information as corresponding to the last four digits of the social security number, in another example implementation, user interface 800 may permit the user to enter other first user information as described above in FIG. 4B (e.g., zip code, billing address, shipping address, etc. or some combination thereof). The user may enter the first user information and may select send button 830. User device 210 may receive the first user information, via interface 800, and may transmit the first user information to authentication server 220.

Additionally, or alternatively, user device 210 may receive, from authentication server 220, a request for second user information when, as described above, the determined level of authentication is medium or high. User device 210 may, as a result of receiving the request, display user interface 800 that permits the user to enter the second user information (e.g., shown as "Please enter your Personal Identification Number (PIN):" in FIG. 8). Additionally, or alternatively, while FIG. 8 describes the second user information as corresponding to the PIN, in another example implementation, user interface 800 may permit the user to enter other second user information as described above in FIG. 4B (e.g., password, username, etc., or some combination thereof). The user may enter the second user information and may select send button 830. User device 210 may receive, via interface 800, the second user information and may transmit the second user information to authentication server 220. Additionally, or alternatively, user device 210 may, as a result of receiving the request, display user interface 800 that permits the user to enter the second user information and the first user information. In this example, user device 210 may receive, via user interface 800, the first user information and the second user information and may send the first user information and the second user information to authentication server 220.

Systems and/or methods described herein may authenticate a user using a unique identification header (UIDH), that is embedded within traffic received from a user device. The UIDH may be generated by encoding an identifier, associated with the user, and a key that is valid for a period of time. The UIDH may be used, by an authentication server, to lookup an MDN associated with the user and to determine whether the MDN is trusted. When the MDN is trusted, the authentication server may authenticate the user when a user device, via which the user is communicating, is not associated with two or more users. When the user device is associated with two or more users, the authentication server may identify a level of authentication to be performed on the user and may perform one or more additional authentication operations on the user based on the identified level of authentication. The additional authentication operations may enable the user to be authenticated based on user information obtained from the user. Authenticating the user, using the UIDH, may enable the user to be authenticated without requiring the user to manage multiple passwords, personal identification numbers (PINs), etc., thus, improving the user experience.

The foregoing description provides illustration and description, but is not intended to be exhaustive or to limit the implementations to the precise form disclosed. Modifications and variations are possible in light of the above implementations or may be acquired from practice of the embodiments.

While series of blocks have been described with regard to FIGS. 5A-5C, and 6, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an application-specific integrated circuit (ASIC), or a field-programmable gate array (FPGA), or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    receiving, by a first server device and from a user device, information associated with a request to receive a service from a second server device, the information including a unique identifier,
        the unique identifier being generated by encoding an identifier, received from the user device and associated with the user device, using a key;
    extracting, by the first server device, the unique identifier from the information associated with the request;
    retrieving, from a memory associated with the first server device, the identifier, associated with the user device, that corresponds to the unique identifier;
    performing, by the first server device, a first authentication operation to determine whether the identifier is trusted;
    determining, by the first server device, that the identifier is trusted based on performing the first authentication operation;
    determining, by the first server device and based on determining that the identifier is trusted, that the user device is a particular type of user device via which one or more other user devices, associated with two or more users, communicate;
    determining, by the first server device, to perform a second authentication operation to authenticate a user, of the user device, based on determining that the user device is the particular type of user device;
    transmitting, by the first server device, a request for user information to authenticate the user, based on determining to perform the second authentication operation;
    receiving, by the first server device, a response to the request for user information;
    determining, by the first server device, that the user is authenticated based on the response; and transmitting, by the first server device and to the second server device, a notification that indicates that the user is authenticated based on determining that the user is authenticated,
the second server device providing the service to the user device based on the notification.

2. The method of claim 1, where retrieving the identifier further includes:
identifying another unique identifier, of a list of unique identifiers that is stored in the memory, that matches the unique identifier; and
retrieving, from the memory, the identifier that corresponds to the other unique identifier.

3. The method of claim 1, where the request for user information includes a request for first information associated with the user;
where the response includes the first information;
where determining that the user is authenticated further comprises:
retrieving, from the memory, second information, associated with the user, that corresponds to the identifier,
the second information being provided by the user prior to receiving the information associated with the request to receive the service;
determining that the first information matches the second information; and
where transmitting the notification further comprises:
transmitting the notification based on determining that the first information matches the second information.

4. The method of claim 1, where the request for user information includes a request for biometric information associated with the user;
where the response includes the biometric information;
where determining that the user is authenticated further comprises:
retrieving, from the memory, other biometric information, associated with the user, that corresponds to the identifier,
the other biometric information being provided by the user prior to receiving the information associated with the request to receive the service;
determining that the biometric information matches the other biometric information; and
where transmitting the notification further comprises:
transmitting the notification based on determining that the biometric information matches the other biometric information.

5. The method of claim 1, further comprising:
identifying a level of authentication based on the identifier; and
where transmitting the request for the user information further comprises at least one of:
transmitting a request for first user information when the level of authentication corresponds to a first level of authentication;
transmitting a request for second user information when the level of authentication corresponds to a second level of authentication,
the second level of authentication being higher than the first level of authentication and the second user information being different than the first user information; or
transmitting a request for biometric information, associated with the user, when the level of authentication corresponds to a third level of authentication,
the third level of authentication being higher than the second level of authentication.

6. The method of claim 1, where determining that the user device is the particular type of user device further comprises:
obtaining, from the memory and based on the identifier, information that identifies a type identifier associated with the user device; and
determining that the user device is the particular type of user device based on the type identifier.

7. The method of claim 1, where determining that the user device is the particular type of user device further comprises:
determining that the user device is a mobile wireless local area network device via which the one or more other user devices communicate; and
determine that the user device is the particular type of user device based on determining that the user device is the mobile wireless local area network device.

8. A device comprising:
a memory to store a list of identifiers associated with a plurality of user devices and a list of encoded identifiers that corresponds to the list of identifiers,
each encoded identifier, of the list of encoded identifiers, corresponding to a different one of the list of identifiers; and
one or more processors to:
receive, from a user device, information associated with a request to access a server device;
identify a first encoded identifier based on the information associated with the request;
identify a second encoded identifier, of the list of encoded identifiers, that matches the first encoded identifier;
determine an identifier, of the list of identifiers, that corresponds to the second encoded identifier;
perform a first authentication operation to determine whether the identifier is trusted;
determine that the identifier is trusted based on performing the first authentication operation;
determine, based on determining that the identifier is trusted, that the user device is a type of user device via which one or more other user devices, associated with two or more users, communicate;
determine to perform a second authentication operation to authenticate a user, of the user device, based on determining that the user device is the type of user device via which the one or more other user devices, associated with the two or more users, communicate;
transmit, to the user device, a request for first information, associated with the user, based on determining to perform the second authentication operation;
receive, from the user device, the first information,
the first information being provided by the user, via the user device, based on the request for the first information;
determine whether the first information matches stored second information, associated with the user, that corresponds to the identifier,
the second information being stored prior to receiving the request to access the server device; and
selectively perform a first action or a second action based on determining whether the first information matches the second information,
the first action including transmitting, to the server device, a notification indicating that the user is authenticated when the first information matches the second information, and
the second action including transmitting, to the server device, a notification indicating that the user is not authenticated when the first information does not match the second information.

9. The device of claim 8, where the first encoded identifier is based on the identifier and a key, the key expiring at a point in time; and
where the one or more processors are further to:
determine that the first encoded identifier has not expired when the information, associated with the request to access the server device, is received before the point in time; and
where the one or more processors, when identifying the second encoded identifier, are further to:
identify the second encoded identifier based on determining that the first encoded identifier has not expired.

10. The device of claim 8, where the one or more processors are further to:
identify a level of authentication with which to perform the second authentication operation; and
perform the second authentication operation based on the identified level of authentication, the second authentication operation including at least one of:
a third authentication operation based on the first information when the level of authentication corresponds to a first level of authentication;
a fourth authentication operation based on third information, associated with the user, when the level of authentication corresponds to a second level of authentication,
the second level of authentication being higher than the first level of authentication and the third information being different than the first information; or
a fifth authentication operation based on biometric information, associated with the user, when the level of authentication corresponds to a third level of authentication,
the third level of authentication being higher than the second level of authentication.

11. The device of claim 8, where the one or more processors, when identifying the first encoded identifier, are further to:
determine that the information associated with the request to access the server device does not include the first encoded identifier;
transmit, to the user device, an instruction to transmit the request to the device via a particular device, the particular device causing the first encoded identifier to be stored in the request;
receive the request via the particular device,
the request, received via the particular device, including the first encoded identifier; and
identify the first encoded identifier based on receiving the request.

12. The device of claim 8, where the one or more processors, when determining that the user device is the type of user device via which the one or more other user devices communicate, are further to:
determine a type identifier associated with the user device based on information associated with the identifier; and
determine that the user device is the type of user device via which the one or more other user devices communicate based on determining the type identifier of the user device.

13. The device of claim 8, where the one or more processors, when determining that the user device is the type of user device via which the one or more other user devices communicate, are further to:

determine that the user device is a mobile wireless local area network device via which the one or more other user devices, associated with the two or more users, are communicating; and
determine that the user device is the type of user device via which the one or more other user devices communicate based on determining that the user device is the mobile wireless local area network device.

14. A non-transitory computer-readable medium storing instructions, the instructions comprising:
one or more instructions that, when executed by at least one processor, cause the at least one processor to:
receive, from a user device, information associated with a request to access a server device, the request including an encoded identifier,
the encoded identifier being generated by encoding an identifier, associated with the user device, using a key;
obtain the identifier using the encoded identifier;
perform a first authentication operation to determine whether the obtained identifier is trusted;
determine that the obtained identifier is trusted based on performing the first authentication operation;
determine, after determining that the obtained identifier is trusted, that the user device is a type of user device via which one or more other user devices, associated with two or more users, communicate;
determine to perform a second authentication operation to authenticate a user, of the user device, based on determining that the user device is the type of user device via which the one or more other user devices communicate;
provide, to the user device, a request for first information, associated with the user, based on determining to perform the second authentication operation;
receive, from the user device, second information associated with the user; and
transmit a notification that indicates whether the user is authenticated,
the notification indicating that the user is authenticated when the first information matches the second information, or
the notification indicating that the user is not authenticated when the first information does not match the second information.

15. The non-transitory computer-readable medium of claim 14, where the request for first information corresponds to a request for at least one of:
information provided by the user via a user interface displayed by the user device,
biometric information associated with the user, or
a combination of the information provided by the user via the user interface and the biometric information.

16. The non-transitory computer-readable medium of claim 14, where the one or more instructions, when executed by the at least one processor, further cause the at least one processor to:
provide, to a particular server device, the identifier,
the particular server device providing a service that identifies whether identifiers, associated with user devices, are trusted;
receive, from the particular server device, an indication that the identifier is trusted; and
where the one or more instructions, that cause the at least one processor to determine that the identifier is trusted, further cause the one or more processors to:

determine that the obtained identifier is trusted based on receiving the indication that the identifier is trusted.

17. The non-transitory computer-readable medium of claim 14, where the user device, associated with the two or more users, corresponds to a mobile wireless local area network device via which one or more other user devices, associated with the two or more users, are communicating.

18. The non-transitory computer-readable medium of claim 14, where the one or more instructions, that cause the at least one processor to determine that the user device is the type of user device via which the one or more other user devices communicate, further cause the at least one processor to:
   search a memory to identify a type identifier, associated with the user device, based on the identifier; and
   determine that the user device is the type of user device via which the one or more other user devices communicate based on searching the memory to identify the type identifier.

19. The non-transitory computer-readable medium of claim 18, where the type identifier indicates that the user device is a mobile wireless area network device via which the one or more other user devices communicate.

20. The non-transitory computer-readable medium of claim 14, where the one or more instructions, that cause the at least one processor to determine that the user device is the type of user device via which the one or more other user devices communicate, further cause the at least one processor to:
   determine that the user device is a mobile wireless local area network device via which the one or more other user devices communicate; and
   determine that the user device is the type of user device via which the one or more other user devices communicate based on determining that the user device is the mobile wireless local area network device.

* * * * *